US012140888B2

(12) United States Patent
Tejima et al.

(10) Patent No.: US 12,140,888 B2

(45) Date of Patent: Nov. 12, 2024

(54) IMAGE FORMING APPARATUS COMPRISING PLURAL INTERMEDIATE TRANSFER BODIES AND AT LEAST ONE CONVEYANCE ROLL IN CONTACT WITH RECORDING MEDIUM IMAGE SIDE BETWEEN SECONDARY TRANSFER UNITS

(71) Applicant: FUJIFILM Business Innovation Corp., Tokyo (JP)

(72) Inventors: Satoshi Tejima, Kanagawa (JP); Akira Shimodaira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/866,565

(22) Filed: Jul. 18, 2022

(65) Prior Publication Data

US 2023/0305442 A1 Sep. 28, 2023

(30) Foreign Application Priority Data

Mar. 28, 2022 (JP) ................................ 2022-052243

(51) Int. Cl.
*G03G 15/16* (2006.01)

(52) U.S. Cl.
CPC ..... *G03G 15/1605* (2013.01); *G03G 15/1655* (2013.01)

(58) Field of Classification Search
CPC ......... G03G 15/6555; G03G 15/00021; G03G 15/657; G03G 21/0047; G03G 15/0225; G03G 15/161; G03G 15/5058
See application file for complete search history.

(56) References Cited

U.S. PATENT DOCUMENTS 5,208,640 A * 5/1993 Horie ................. G03G 15/0163 271/301
5,809,388 A * 9/1998 Inada ..................... G03G 15/20 347/156

(Continued)

FOREIGN PATENT DOCUMENTS

JP H1144973 2/1999
JP 2009003236 1/2009

(Continued)

*Primary Examiner* — Arlene Heredia
(74) *Attorney, Agent, or Firm* — JCIPRNET

(57) ABSTRACT

An image forming apparatus includes a conveyance unit that conveys a recording medium in contact with one surface of the recording medium along a conveyance path; a plural intermediate transfer bodies that are arranged in a conveyance direction on the other surface side of the recording medium of the conveyance path and to which toner images formed by a plural image forming sections are primarily transferred; a plural secondary transfer units that are arranged in a conveyance direction and secondarily transfers the toner images of the plural intermediate transfer bodies to the other surface of the recording medium conveyed by the conveyance unit; and one or more rotating bodies of which peripheral surfaces are in contact with the other surface of the recording medium conveyed by the conveyance unit between one secondary transfer unit and another secondary transfer unit, among the secondary transfer units arranged in the conveyance direction.

8 Claims, 9 Drawing Sheets

(56) References Cited

U.S. PATENT DOCUMENTS

| | | | | | |
|---|---|---|---|---|---|
| 6,137,976 | A * | 10/2000 | Itaya | G03G 15/101 399/302 |
| 7,046,947 | B1 * | 5/2006 | Castelli | G03G 15/6567 399/307 |
| 10,670,996 | B2 * | 6/2020 | Hashimoto | G03G 21/1604 |
| 10,852,669 | B2 * | 12/2020 | Goda | G03G 21/1604 |
| 10,915,043 | B2 * | 2/2021 | Ichiki | G03G 15/0189 |
| 11,254,530 | B2 * | 2/2022 | Oshiro | B65H 9/008 |
| 11,262,674 | B2 * | 3/2022 | Ichiki | G03G 15/1615 |
| 11,262,697 | B2 * | 3/2022 | Goda | G03G 21/206 |
| 11,327,420 | B2 * | 5/2022 | Shimodaira | G03G 15/602 |
| 2006/0188299 | A1 * | 8/2006 | Matsumoto | G03G 15/0136 399/302 |
| 2014/0010577 | A1 | 1/2014 | Devlieghere et al. | |
| 2014/0376962 | A1 * | 12/2014 | Hiramatsu | G03G 15/168 399/123 |
| 2019/0187581 | A1 * | 6/2019 | Adachi | G03G 15/20 |
| 2020/0096912 | A1 * | 3/2020 | Goda | G03G 15/1605 |

FOREIGN PATENT DOCUMENTS

| | | | |
|---|---|---|---|
| JP | 2013212597 | A * | 10/2013 |
| JP | 2014013388 | | 1/2014 |

* cited by examiner

IMAGE FORMING APPARATUS COMPRISING PLURAL INTERMEDIATE TRANSFER BODIES AND AT LEAST ONE CONVEYANCE ROLL IN CONTACT WITH RECORDING MEDIUM IMAGE SIDE BETWEEN SECONDARY TRANSFER UNITS

CROSS-REFERENCE TO RELATED APPLICATIONS

This application is based on and claims priority under 35 USC 119 from Japanese Patent Application No. 2022-052243 filed Mar. 28, 2022.

BACKGROUND

(i) Technical Field

The present invention relates to an image forming apparatus.

(ii) Related Art

JP1999-44973A discloses a technique relating to an image forming apparatus such as an electrophotographic copying machine and a printer, and particularly relating to an improvement of a double-sided image forming apparatus capable of forming a double-sided image. In this related art, an air conveyance unit that is disposed on at least one side of a recording material conveyance path between a most downstream transfer unit and a fixing unit, a recording material detecting unit which detects information on a recording material to be conveyed, and an air flow rate control unit that controls the air flow rate of the air conveyance unit, based on the detection result from the recording material detecting unit are provided. Further, one or a plurality of rows of star wheels are provided on at least one surface side of a recording material conveyance path so as to be rotatable with respect to the recording material conveyance direction. Further, a temporary fixing unit capable of temporarily fixing an unfixed image on at least one surface side of the recording material is provided, and the temporarily fixed recording material is guided to a fixing unit by a recording material guide member.

JP2009-3236A discloses an image forming apparatus, particularly a technique relating to an image forming apparatus capable of forming a developer image based on image information. In the related art, provided is a color printer capable of forming a developer image based on image information, which includes a main body having a plurality of first image forming units, a first transfer belt, and an elastic roller. The first image forming unit is a unit capable of forming an image of each color based on image information. The images formed by the first image forming unit are transferred to the first transfer belt. The intermediate transfer roller has at least a surface formed of an elastic member, and an image is transferred from the first transfer belt and the transferred image is transferred to paper. The main body can accommodate the first image forming units, the first transfer belt, and an intermediate transfer roller inside, and has a shutter portion that is disposed in the vicinity of the intermediate transfer roller and can be opened and closed.

JP2014-13388A discloses a technique relating to a color image duplication system in which a developed image is transferred from an image forming member to a receiving material via at least one intermediate transfer member. In this related art, a toner, and first and second toner image acquisition devices each having a toner are provided, the first toner image acquisition device transfers the toner to the second toner image acquisition device, and the second toner image acquisition device transfers the toner to the receiving material.

SUMMARY

In an image forming apparatus that secondarily transfers and superimposes toner images in sequence to a recording medium conveyed from a plurality of intermediate transfer bodies to which the toner images are primarily transferred, there is a risk that the recording medium conveyed between the secondary transfer units arranged in the conveyance direction may be separated from the conveyance path.

Aspects of non-limiting embodiments of the present disclosure relate to an image forming apparatus that can prevent a recording medium conveyed between secondary transfer units arranged in a conveyance direction from being separated from a conveyance path, as compared with a case where there is no member that comes into contact with a surface to which a toner image of the recording medium is transferred, the recording medium being conveyed between the secondary transfer units arranged in the conveyance direction.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a conveyance unit that conveys a recording medium in contact with one surface of the recording medium along a conveyance path; a plurality of intermediate transfer bodies that are arranged in a conveyance direction on the other surface side of the recording medium of the conveyance path and to which toner images formed by a plurality of image forming sections are primarily transferred; a plurality of secondary transfer units that are arranged in a conveyance direction and secondarily transfers the toner images of the plurality of intermediate transfer bodies to the other surface of the recording medium conveyed by the conveyance unit; and one or more rotating bodies of which peripheral surfaces are in contact with the other surface of the recording medium conveyed by the conveyance unit between one secondary transfer unit and another secondary transfer unit, among the secondary transfer units arranged in the conveyance direction.

BRIEF DESCRIPTION OF THE DRAWINGS

Exemplary embodiment(s) of the present invention will be described in detail based on the following figures, wherein:

FIG. 5 is a block diagram showing a configuration of a control device and the like;

DETAILED DESCRIPTION

First Exemplary Embodiment

An image forming apparatus according to a first exemplary embodiment of the present invention will be described.

Figure 1:
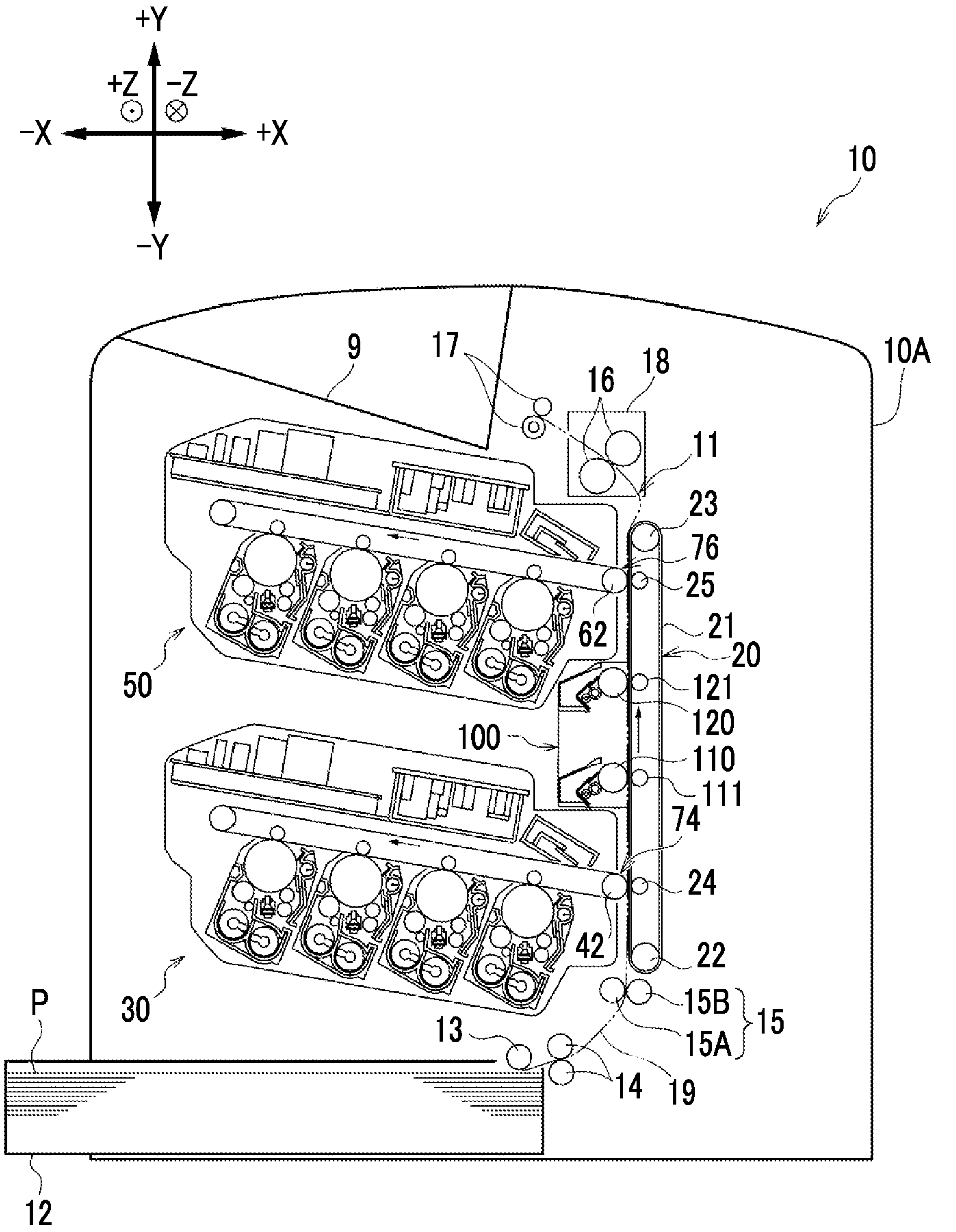
FIG. 1 is a configuration diagram of an image forming apparatus according to a first exemplary embodiment.

The width direction of the image forming apparatus 10 shown in FIG. 1 is an X direction, the height direction is a Y direction, and the depth direction is a Z direction, which are indicated by arrows X, Y, and Z, respectively. In a case where it is necessary to distinguish one side and the other side of the X direction, the Y direction, and the Z direction, with respect to the image forming apparatus 10 shown in FIG. 1, the right side is described as the +X side, the left side is described as the −X side, and the upper side is described as the +Y side, the lower side is described as −Y side, the front side is described as +Z side, and the rear side is described as −Z side. Further, in the present exemplary embodiment, the recording paper P is adopted as an example of the recording medium, the upstream side in the conveyance direction in which the recording paper P is conveyed is defined as the "upstream side in the conveyance direction", and the downstream side in the conveyance direction is "downstream side in the conveyance direction". The image forming apparatus 10 in the present exemplary embodiment is a so-called single-pass type, and printing is performed by the recording paper P passing through the front of the image forming unit 30 and the image forming unit 50, which will be described later.

Overall Configuration

First, the overall configuration of the image forming apparatus will be described.

As shown in FIG. 1, the image forming apparatus 10 includes an accommodating unit 12 that accommodates recording paper P (see also FIG. 4) as an example of a recording medium, a conveyance unit 11 that conveys the recording paper P along a conveyance path 19, and an image forming unit 30 and an image forming unit 50 that form a toner image to be transferred to the recording paper P. The "conveyance direction" is the direction in which the recording paper P is conveyed along the conveyance path 19.

The accommodating unit 12 can be pulled out from the image forming apparatus main body 10A, which is the apparatus main body of the image forming apparatus 10, and accommodates the recording paper P.

The conveyance unit 11 includes a feed roll 13, a conveyance roll 14, a resist roll pair 15, a conveyor belt unit 20, a fixing device 18, a discharge roll 17, and the like, in order from the upstream side in the conveyance direction.

The feed roll 13 sends out the recording paper P accommodated in the accommodating unit 12 to the conveyance path 19 configuring the conveyance unit 11. The conveyance roll 14 conveys the recording paper P along the conveyance path 19.

The resist roll pair 15 conveys the recording paper P conveyed by the conveyance roll 14 to a secondary transfer position TJ2 on the upstream side, which will be described later. The resist roll pair 15 sandwiches the recording paper P between the resist roll 15A and the pinch roll 15B, and conveys the recording paper P to the downstream side in the conveyance direction.

The conveyor belt unit 20 conveys the recording paper P to the downstream side in the conveyance direction along the conveyance path 19 while transferring the toner image formed by the image forming units 30 and 50 to the recording paper P. The details of the conveyor belt unit 20 will be described later.

The fixing device 18 has a fixing roll pair 16, and in a case where the recording paper P on which the toner image is transferred passes through the fixing roll pair 16, the fixing device 18 heats and pressurizes the recording paper P to fix the toner image on the recording paper P.

The discharge roll 17 discharges the recording paper P on which the toner image is fixed by the fixing device 18, to the discharge unit 9.

The image forming unit 30 and the image forming unit 50 are disposed side by side in the vertical direction. In the present exemplary embodiment, the image forming unit 50 is disposed above the image forming unit 30. From another point of view, the image forming unit 50 is disposed on the downstream side in the conveyance direction of the image forming unit 30.

Figure 2:
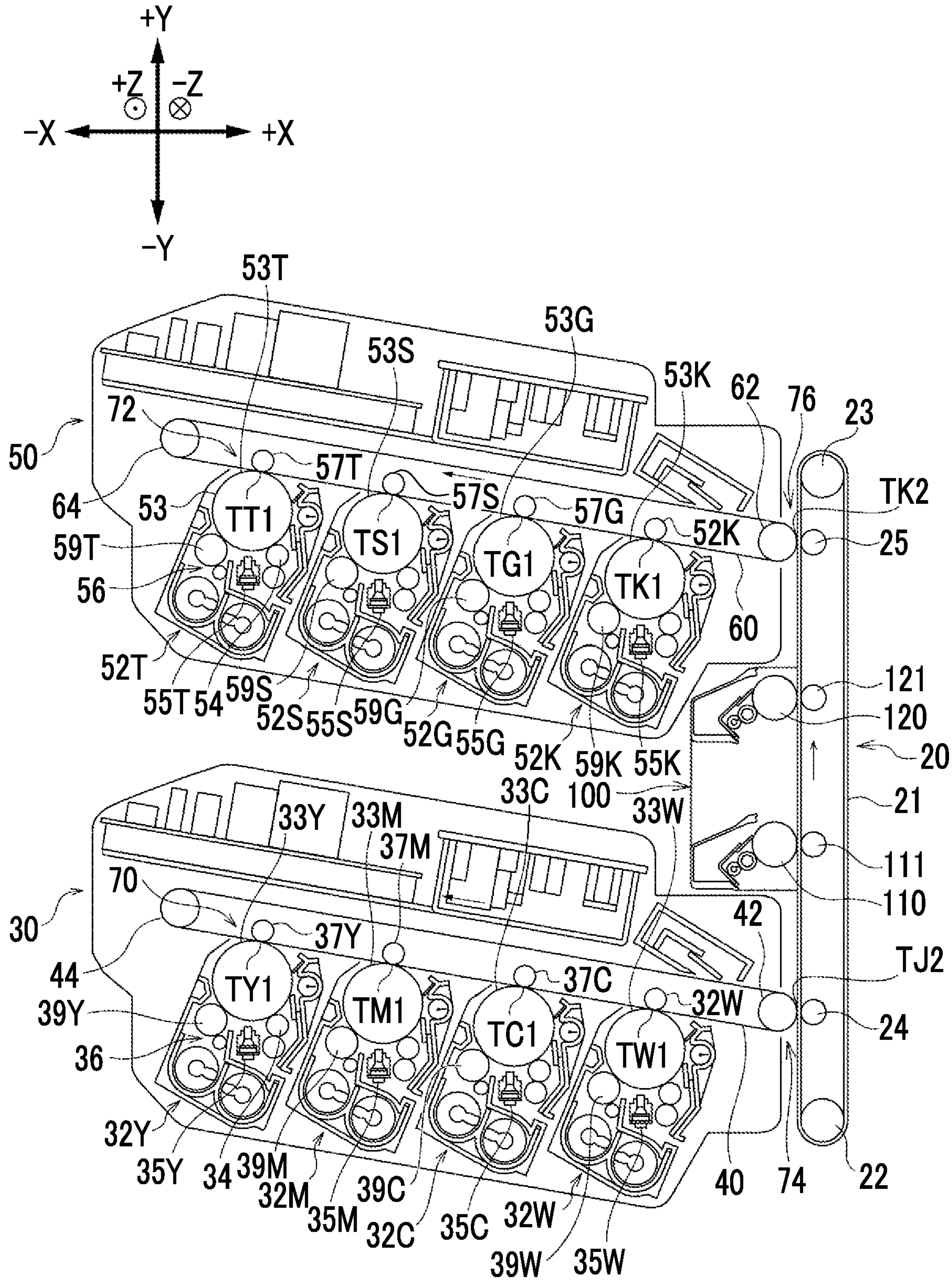
FIG. 2 is an enlarged view of a main part of FIG. 1.

As shown in FIG. 2, the image forming unit 30 includes a plurality of (four in the present exemplary embodiment) image forming sections 32, and an endless intermediate transfer belt 40. The toner images formed by the four image forming sections 32 are transferred to the intermediate transfer belt 40 as an example of the intermediate transfer body, and the intermediate transfer belt 40 is mounted to be rotatable counterclockwise with a front view of FIG. 2.

The image forming section 32 includes an image forming section 32W that forms a white toner image of white color, an image forming section 32M that forms a magenta toner image of magenta color, an image forming section 32C that forms a cyan toner image of cyan color, and an image forming section 32Y that forms a yellow toner image of yellow color. The four image forming sections 32 are disposed in the order of the image forming section 32Y, the image forming section 32M, the image forming section 32C, and the image forming section 32W in order from the upstream side in the rotation direction (the side closer to the support roll 44 described later) in which the intermediate transfer belt 40 rotates. In a case where it is not necessary to distinguish between Y, M, C, and W, these are omitted.

Further, in the following, the upstream side in the rotation direction of the intermediate transfer belt 40 is referred to as "the rotation direction upstream side", and the downstream side in the rotation direction is referred to as "the rotation direction downstream side". That is, in the image forming section 32, the image forming section 32W is disposed on the most rotation direction downstream side.

The image forming section 32 includes a photoconductor 33, a photoconductor charging member 34 that charges the peripheral surface of the photoconductor 33, an exposure device 35 that irradiates the charged photoconductor 33 with exposure light, and a developing device 36 that develops an electrostatic latent image formed by the irradiation of the exposure light to be visualized as a toner image.

Developing rolls 39Y, 39M, 39C, and 39W are provided in the developing device 36, respectively, and are applied with a developing bias by the power supply device 99 (see FIG. 5), respectively.

Further, primary transfer rolls 37Y, 37M, 37C, and 37W for transferring the toner image formed by the image forming section 32 to the intermediate transfer belt 40 are disposed at positions facing each photoconductor 33 with the intermediate transfer belt 40 interposed therebetween. The intermediate transfer belt 40 is wound around a support roll 44 that supports the intermediate transfer belt 40 and a backup roll 42 that is disposed on the secondary transfer unit 74 on the upstream side, which will be described later. The primary transfer unit 70 includes a photoconductor 33, a primary transfer roll 37, and an intermediate transfer belt 40. Further, the primary transfer positions TY1, TM1, TC1, and TW1 are set between the photoconductors 33Y, 33M, 33C, and 33W and the intermediate transfer belt 40, respectively.

The image forming unit 50 has the same configuration as the above-described image forming unit 30 except that colors for forming an image are different.

The image forming unit 50 includes a plurality of (four in the present exemplary embodiment) image forming sections 52, and an intermediate transfer belt 60. The toner images formed by the four image forming sections 52 are transferred to the intermediate transfer belt 60 as an example of the intermediate transfer body, and the intermediate transfer belt 60 is mounted to be rotatable counterclockwise with a front view of FIG. 2.

The image forming section 52 has the same configuration as the image forming section 32 of the image forming unit 30 except that colors for forming an image are different. Further, the intermediate transfer belt 60 and the primary transfer roll 57 described later have the same configuration as the intermediate transfer belt 40 and the primary transfer roll 37 of the image forming unit 30. Further, the other constituent members configuring the image forming unit 50 are the same as in the image forming unit 30.

The image forming section 52 includes an image forming section 52K that forms a black toner image of black color, an image forming section 52G that forms a gold toner image of gold color, an image forming section 52S that forms a silver toner image of silver color, and an image forming section 52T that forms a transparent toner image. In a case where it is not necessary to distinguish between T, S, G, and K, these are omitted.

The four image forming sections 52 are disposed in the order of the image forming section 52T, the image forming section 52S, the image forming section 52G, and the image forming section 52K in order from the rotation direction upstream side (the side closer to the support roll 64 described later). That is, in the image forming section 52, the image forming section 52K is disposed on the most rotation direction downstream side, the image forming section 52G and the image forming section 52S are disposed on the upstream side in the rotation direction with respect to the image forming section 52K, and the image forming section 52T is disposed on the most rotation direction upstream side.

The image forming section 52 includes a photoconductor 53, a photoconductor charging member 54, an exposure device 55, and a developing device 56.

Developing rolls 59T, 59S, 59G, and 59K are provided in the developing device 56, respectively, and are applied with a developing bias by the power supply device 99 (see FIG. 5), respectively.

Further, the primary transfer rolls 57T, 57S, 57G, and 57K are disposed at positions facing respective photoconductors 53 with the intermediate transfer belt 60 interposed therebetween. The intermediate transfer belt 60 is wound around a support roll 64 and a backup roll 62 disposed on a secondary transfer unit 76 on the downstream side, which will be described later. The primary transfer unit 72 includes the photoconductor 53, the primary transfer roll 57, and the intermediate transfer belt 60. Further, the primary transfer positions TT1, TS1, TG1, and TK1 are set between the photoconductors 53T, 53S, 53G, and 53K and the intermediate transfer belt 60, respectively.

The developing device 36 of the image forming section 32 of each color of the image forming unit 30 and the developing device 56 of the image forming section 52 of each color of the image forming unit 50 are connected to a plurality of toner cartridges (not shown) in which a toner corresponding to each color is accommodated via a supply path. The toner accommodated in each toner cartridge is appropriately supplied to the developing devices 36 and 56 of each color via the supply path by operating a supply device (not shown) provided in the supply path.

Further, in the present exemplary embodiment, since each image forming section 52 of the image forming unit 50 is provided under the intermediate transfer belt 60, each image forming section 52 is disposed between the intermediate transfer belt 40 and the intermediate transfer belt 60.

Conveyance Roll Unit

Next, the details of the conveyor belt unit 20 will be described.

Figure 3:
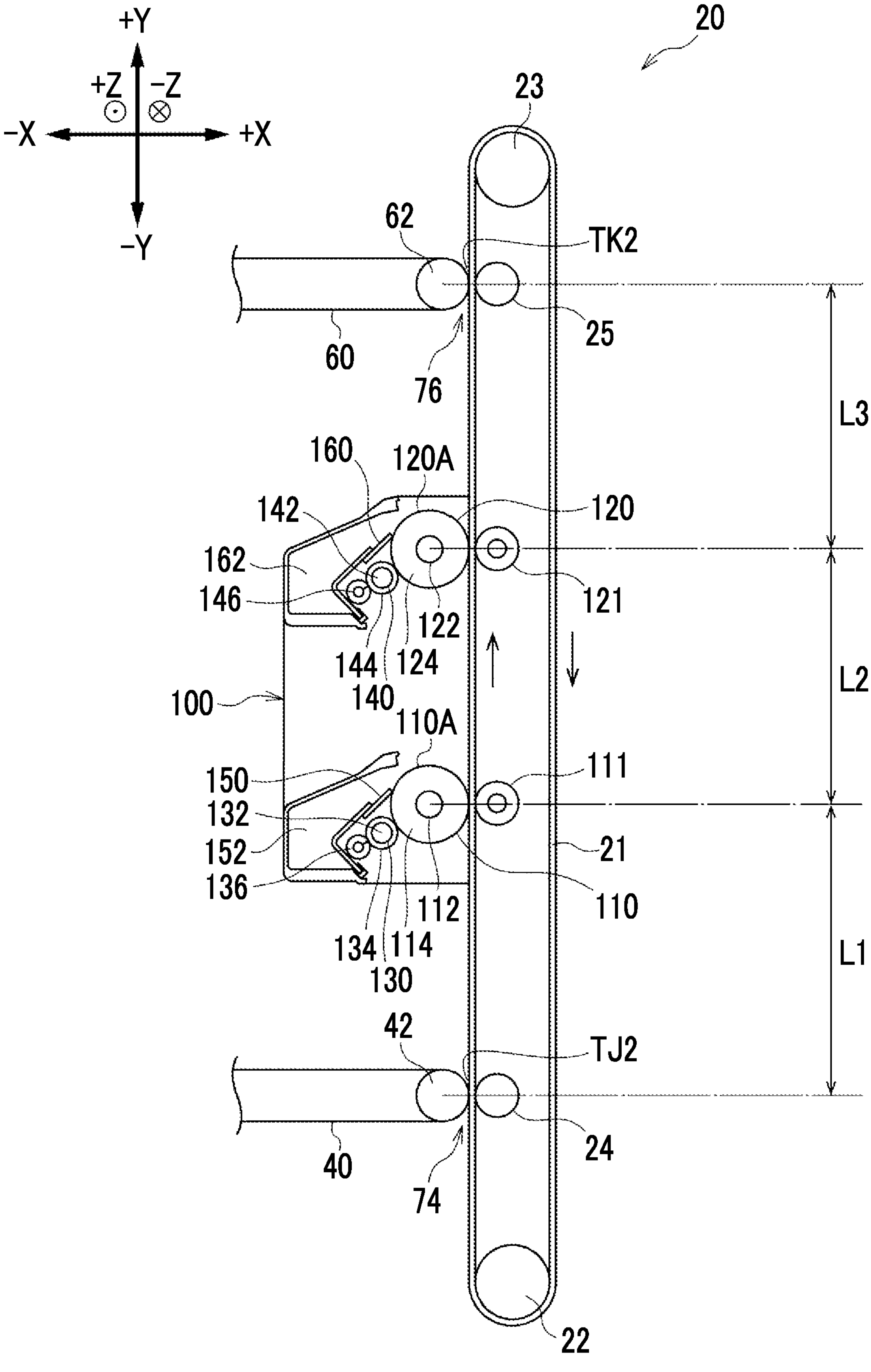
FIG. 3 is a configuration diagram of a conveyor belt device according to the first exemplary embodiment.

As shown in FIGS. 2 and 3, the conveyor belt unit 20 includes an endless conveyor belt 21, a support roll 22 that supports the conveyor belt 21, a drive roll 23 that rotates the conveyor belt 21, secondary transfer rolls 24 and 25 disposed at positions facing the backup rolls 42 and 62 with intermediate transfer belts 40 and 60 interposed therebetween, conveyance rolls 110 and 120 of a conveyance roll unit 100, which will be described later, facing rolls 111 and 121 disposed at positions facing the conveyance rolls 110 and 120 with the conveyor belt 21 interposed therebetween.

The conveyor belt 21 as an example of the conveyance unit is stretched by the support roll 22 and the drive roll 23 provided at intervals in the conveyance direction of the recording paper P (see FIGS. 1 and 4), in the vertical direction (Y direction) in the present exemplary embodiment. The drive roll 23 is rotated by a drive mechanism (not shown), so that the endless conveyor belt 21 is rotated. The support roll 22 is driven to rotate with the rotation of the conveyor belt 21.

The conveyance direction of the recording paper P to be conveyed by the conveyor belt unit 20 in the present exemplary embodiment is the Y direction.

The secondary transfer roll 24 sandwiches the recording paper P (see FIGS. 1 and 4) and the conveyor belt 21 between the backup roll 42 and the secondary transfer roll 24, and transfers the toner image TZ (see FIG. 4) formed on the intermediate transfer belt 40 of the image forming unit 30 to the surface PA (see FIG. 4) of the recording paper P conveyed by the conveyor belt 21. Similarly, the secondary transfer roll 25 sandwiches the recording paper P and the conveyor belt 21 between the backup roll 62 and the secondary transfer roll 25, and transfers the toner image formed on the intermediate transfer belt 60 of the image forming unit 50 to the surface PA (see FIG. 4) of the recording paper P.

Figure 4:
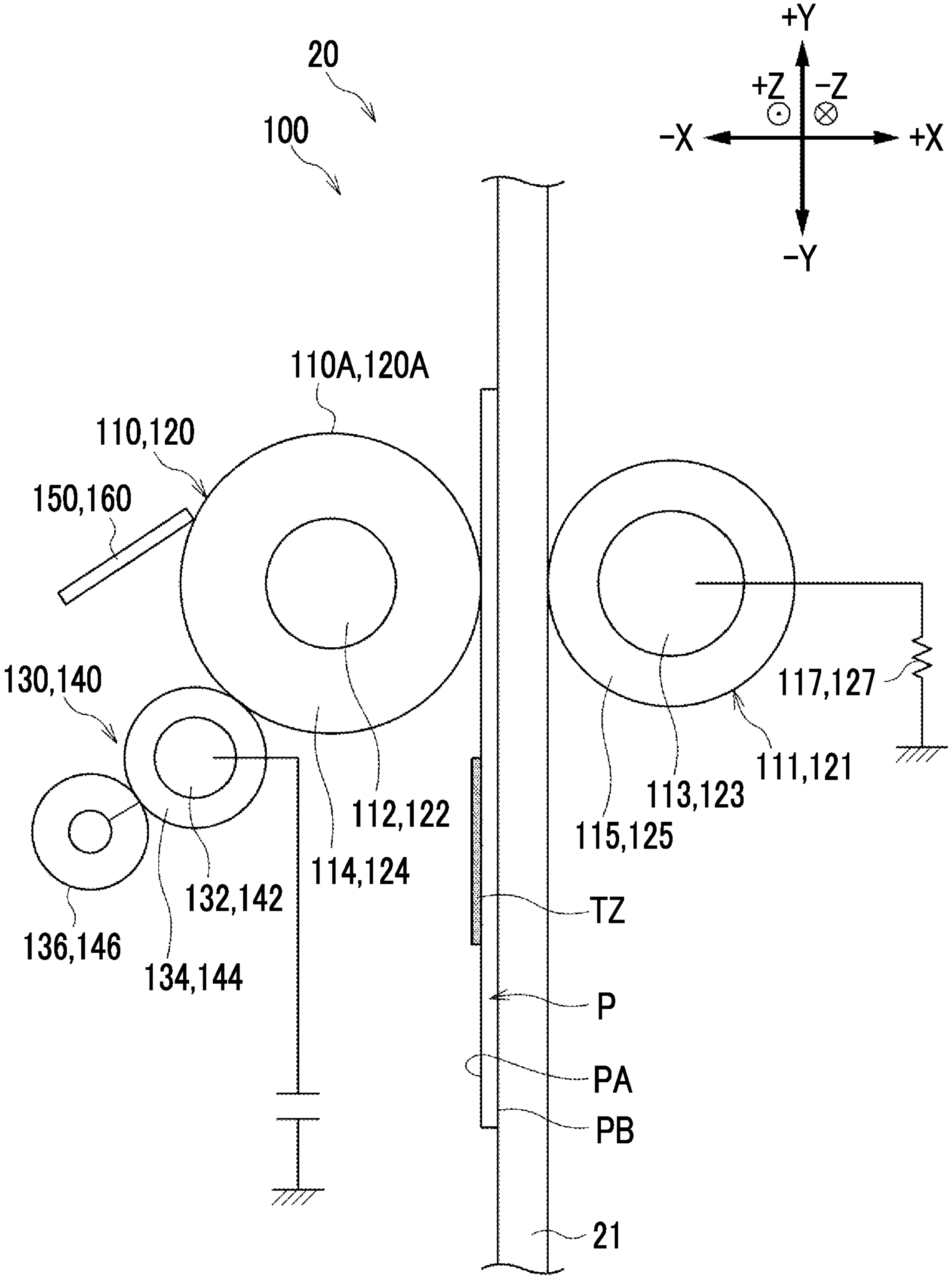
FIG. 4 is a schematic diagram of a main part of FIG. 3.

As shown in FIG. 4, the side of the recording paper P on which the toner image TZ is transferred is referred to as a surface PA, and the side in contact with the conveyor belt 21 is referred to as a surface PB.

As shown in FIGS. 2 and 3, the secondary transfer unit 74 includes the backup roll 42, the secondary transfer roll 24, and the intermediate transfer belt 40. Further, the secondary transfer unit 76 includes the backup roll 62, the secondary transfer roll 25, and the intermediate transfer belt 60.

The secondary transfer rolls 24 and 25 are driven to rotate with the rotation of the conveyor belt 21. Further, a transfer bias is applied to the secondary transfer rolls 24 and 25 by the power supply device 99 (see FIG. 5), respectively.

The secondary transfer position TJ2 is defined between the intermediate transfer belt 40 of the image forming unit 30 and the conveyor belt 21, and the secondary transfer position TK2 is defined between the intermediate transfer belt 60 of the image forming unit 50 and the conveyor belt 21. The secondary transfer position TK2 is the most downstream secondary transfer position.

Further, the conveyor belt unit 20 includes a belt cleaning device (not shown) that cleans the conveyor belt 21. The belt cleaning device (not shown) cleans the conveyor belt 21 on the rotation direction downstream side of the most downstream secondary transfer position TK2 and on the rotation direction upstream side of the most upstream secondary transfer position TJ2.

A conveyance roll unit 100 is provided between the image forming unit 30 and the image forming unit 50 arranged at intervals in the conveyance direction on the surface PA (see FIG. 4) side of the recording paper P of the conveyor belt 21 as an example of the conveyance unit, in the vertical direction in the present exemplary embodiment.

The conveyance roll unit 100 has a plurality of (two in the present exemplary embodiment) conveyance rolls 110 and 120. The recording paper P (see FIG. 4) and the conveyor belt 21 are sandwiched between the conveyance rolls 110 and 120 as an example of the rotating body and the facing rolls 111 and 121, and the recording paper P is conveyed to the downstream side in the conveyance direction. The conveyance rolls 110 and 120 are configured to rotate by a drive mechanism (not shown).

The conveyance rolls 110 and 120 and the members around the conveyance rolls 110 and 120 are the same members except that the positions in the conveyance direction are different. Therefore, in the schematic diagram of FIG. 4, the conveyance rolls 110 and 120 are shown without distinction.

As shown in FIGS. 3 and 4, the conveyance rolls 110 and 120 are configured to include columnar shaft portions 112 and 122 made of metal, and roll main bodies 114 and 124 made of an insulating resin, having a circular cross-sectional outer shape orthogonal to the axial direction, formed around the shaft portions 112 and 122. The roll main bodies 114 and 124 of the present exemplary embodiment are made of fluororesin. Further, the coefficient of static friction with respect to the recording paper P (see FIGS. 1 and 4) on the peripheral surfaces 110A and 120A of the conveyance rolls 110 and 120 is 0.3 or less. The recording paper P in this case is plain paper.

Figure 9:
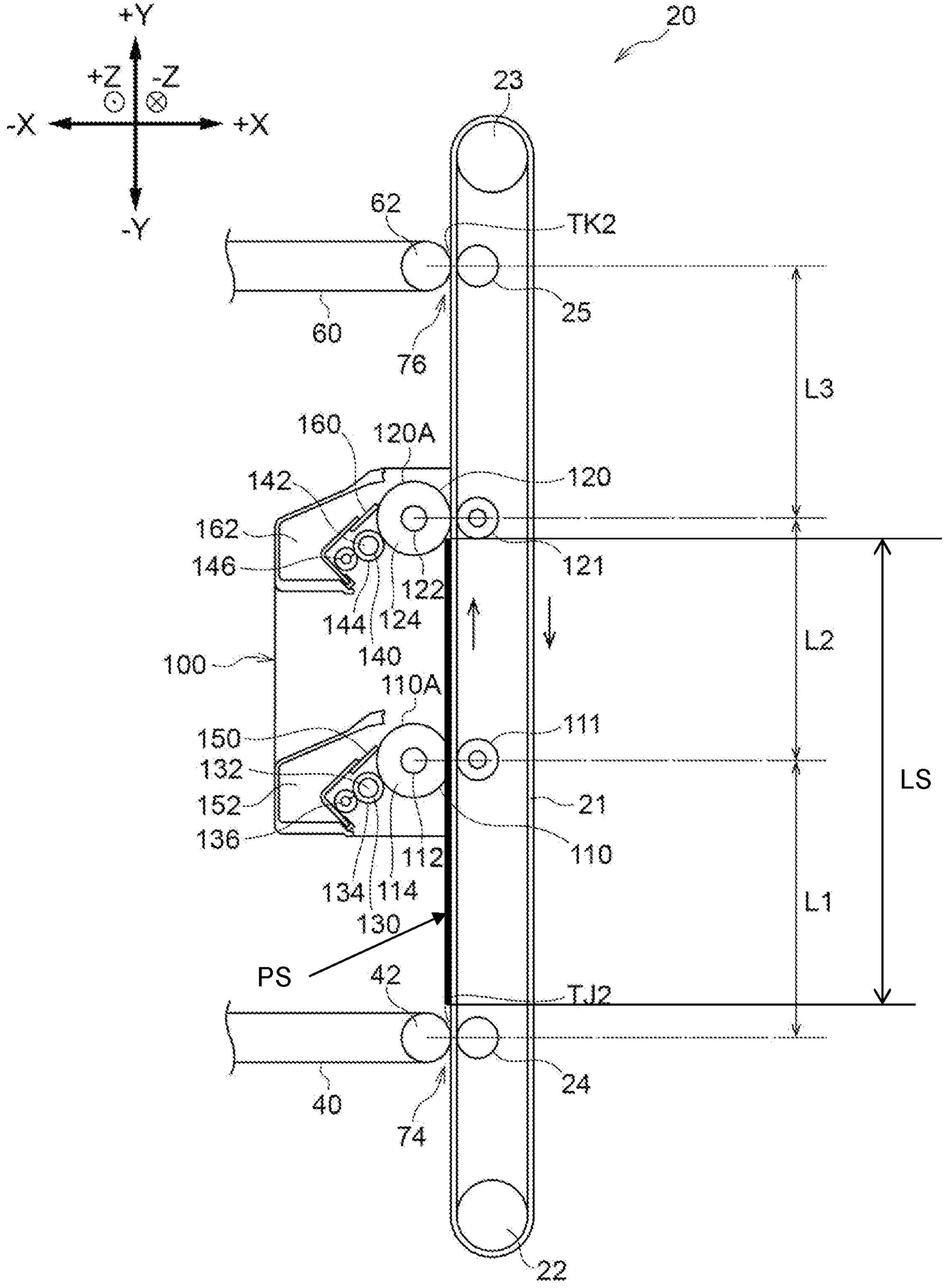
FIG. 9 is a schematic diagram illustrating distances between axes of conveyance rolls and secondary transfer rolls with reference to a minimum width of a minimum recording paper.

Here, the width of the minimum recording paper PS in the image forming apparatus 10 (as shown in FIG. 1) in the conveyance direction is defined as the minimum width LS (see FIG. 9). In the present exemplary embodiment, the minimum width LS is for the lateral feed of the A5-size recording paper PS. That is, in the present exemplary embodiment, the minimum width LS is for the short side width of A5 size.

As shown in FIG. 9, the distance L1 between the conveyance roll 110 and the secondary transfer unit 74 on the upstream side in the conveyance direction is equal to or less than the minimum width LS. Similarly, the distance L3 between the conveyance roll 120 and the secondary transfer unit 76 on the downstream side in the conveyance direction is equal to or less than the minimum width LS. Further, the distance L2 between the conveyance roll 110 on the upstream side in the conveyance direction and the conveyance roll 120 on the downstream side in the conveyance direction is equal to or less than the minimum width LS. As shown in FIG. 3 and FIG. 9, the distances L1, L2, and L3 are the distances between the axes of the conveyance rolls 110 and 120 and the secondary transfer rolls 24 and 25 of the secondary transfer units 74 and 76.

It is desirable that the distance L1 between the conveyance roll 110 on the upstream side in the conveyance direction and the secondary transfer unit 74 is, for example, smaller than the minimum width LS. Similarly, it is desirable that the distance L3 between the conveyance roll 120 on the downstream side in the conveyance direction and the secondary transfer unit 76 is, for example, smaller than the minimum width LS. Further, it is desirable that the distance L2 between the conveyance roll 110 on the upstream side in the conveyance direction and the conveyance roll 120 on the downstream side in the conveyance direction is, for example, smaller than the minimum width LS.

As shown in FIGS. 3 and 4, the conveyance roll units 100 and 200 are provided with charging rolls 130 and 140 as an example of charging members for the conveyance rolls 110 and 120 that are driven to rotate in contact with the peripheral surfaces 110A and 120A of the conveyance rolls 110 and 120. The charging rolls 130 and 140 include metal shaft portions 132 and 142, and semi-conductive rubber portions 134 and 144 having a circular cross-sectional outer shape orthogonal to the axial direction, formed around the shaft portions 132 and 142. A roll charging bias is applied to the metal shaft portions 132 and 142 of the charging rolls 130 and 140 by the power supply device 99 (see FIG. 5), and peripheral surfaces 110A and 120A of the conveyance rolls 110 and 120 are charged to a set potential.

Specifically, it is charged to have the same polarity as the toner image TZ (see FIG. 4), that is, a negative polarity in the present exemplary embodiment. The potential due to charging of the peripheral surfaces 110A and 120A of the conveyance rolls 110 and 120 in the present exemplary embodiment is −300 to −600 v, but it is an example and is not limited to this potential.

The charging rolls 130 and 140 are in contact with the cleaning rolls 136 and 146 in which a sponge as an example of a cleaning member is spirally wound. The cleaning rolls 136 and 146 come into contact with the peripheral surfaces of the charging rolls 130 and 140 and are driven to rotate to clean the peripheral surfaces of the charging rolls 130 and 140. Deposits such as toner and dust cleaned by the cleaning rolls 136 and 146 are conveyed to a waste toner box (not shown) and collected.

Further, the cleaning blades 150 and 160 as an example of the cleaning member are in contact with the peripheral surfaces 110A and 120A of the conveyance rolls 110 and 120 to clean the peripheral surfaces 110A and 120A. Deposits such as toner and dust cleaned by the cleaning blades 150 and 160 are stored in the storage units 152 and 162 (see FIG. 3), and then conveyed to a waste toner box (not shown) and collected.

The facing rolls 111 and 121 described above are configured to include columnar shaft portions 113 and 123 made of metal, and roll main bodies 115 and 125 made of rubber, having a circular cross-section orthogonal to the axial direction, formed around the shaft portions 113 and 123. The metal shaft portions 113 and 123 are grounded via resistors 117 and 127 (see FIG. 4). Therefore, the potentials of the facing rolls 111 and 121 are 0 v.

In a state where the peripheral surfaces 110A and 120A of the conveyance rolls 110 and 120 are charged to −300 to −600 v by the charging rolls 130 and 140, in the negatively charged toner image TZ (see FIG. 4), the electric field formed between the peripheral surfaces 110A and 120A of the conveyance rolls 110 and 120 and the facing rolls 111 and 121 generates an electrostatic force in the direction toward the conveyor belt 21 and the recording paper P.

Figure 5:
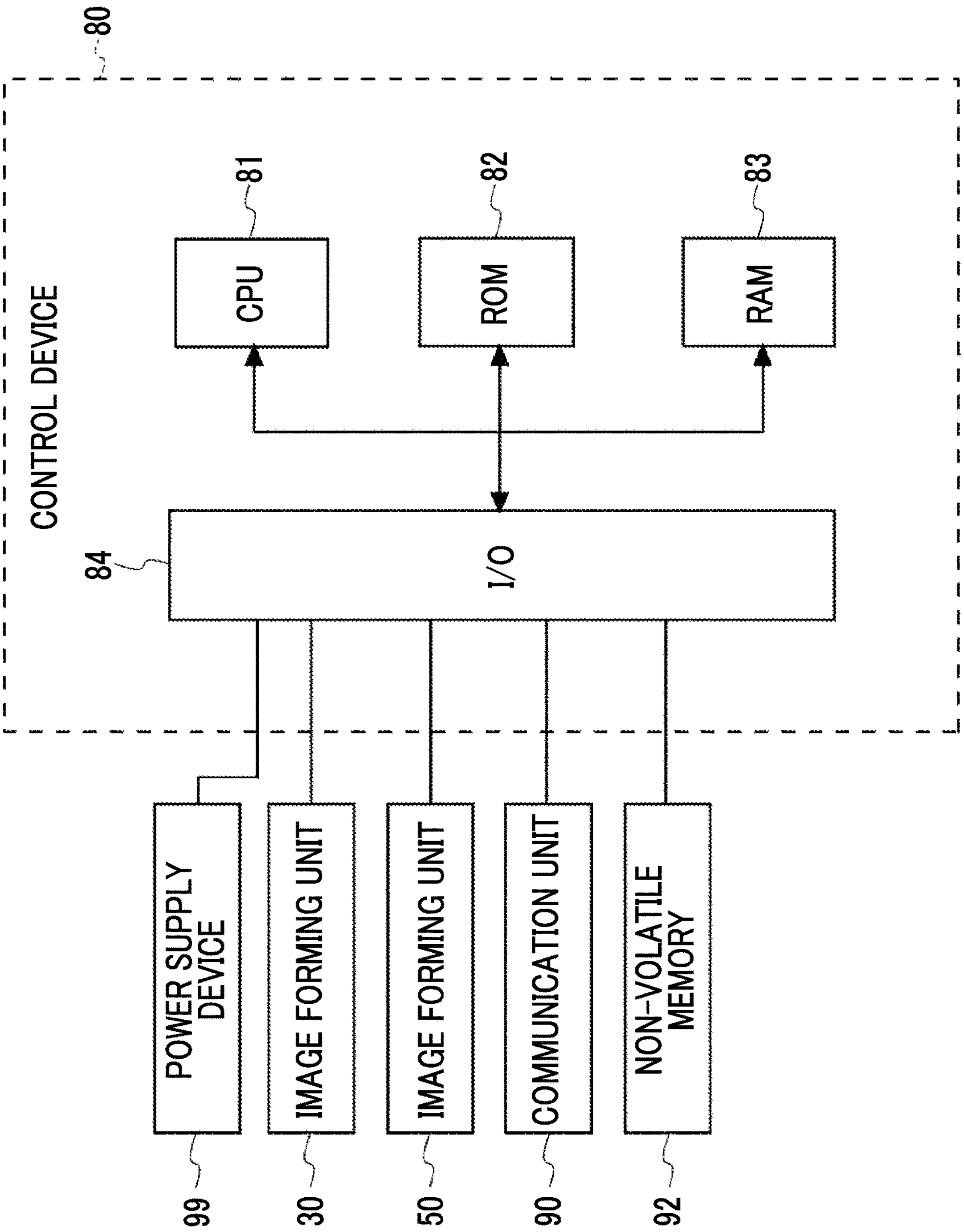

Here, the facing rolls 111 and 121 can be switched from the grounded state to the state in which a potential larger than the absolute value of the potentials of the conveyance rolls 110 and 120 is applied by the power supply device 99 (see FIG. 5). In this state, an electric field formed between the peripheral surfaces 110A and 120 of the conveyance rolls 110 and 120 and the facing rolls 111 and 121 generates an electrostatic force in the direction toward the conveyance rolls 110 and 120.

Control Device

Next, the control device 80 that controls the operation of the image forming apparatus 10 will be described with reference to FIG. 5.

As shown in FIG. 5, an image forming unit 30, an image forming unit 50, a communication unit 90, a non-volatile memory 92, a power supply device 99, or the like are electrically connected to the control device 80.

The control device 80 is connected to a Central Processing Unit (CPU) 81, a Read Only Memory (ROM) 82, a Random Access Memory (RAM) 83, and an input/output interface (I/O) 84 via a bus.

Here, the ROM 82 stores an image formation control program (not shown) to be executed by the CPU 81. Then, the CPU 81 reads the image formation control program (not shown) from the ROM 82 and expands the image formation control program into the RAM 83 to execute a printing process by the image formation control program (not shown).

Further, the image forming unit 30, the image forming unit 50, the communication unit 90, and the non-volatile memory 92 are connected to the I/O 84. The communication unit 90 is an interface for mutual data communication between a terminal device such as a personal computer (not shown) and an image forming apparatus 10. The non-volatile memory 92 stores information necessary for the image forming apparatus 10 to execute the image forming operation.

The control device 80 performs various controls for forming a toner image on the intermediate transfer belt 40 (see FIG. 2 and the like) by the image forming section 32 (see FIG. 2 and the like) of each color of the image forming unit 30. Similarly, various controls are performed for forming a toner image on the intermediate transfer belt 60 (see FIG. 2 and the like) by the image forming section 52 (see FIG. 2 and the like) of each color of the image forming unit 50.

Further, the control device 80 controls the developing bias to be applied to the developing rolls 39Y, 39M, 39C, 39W, 59T, 59S, 59G, and 59K (see FIG. 2 or the like) of the developing devices 36 and 56 by the power supply device 99. Further, the control device 80 controls the transfer bias to be applied to the secondary transfer rolls 24 and 25 (see FIG. 2 or the like) by the power supply device 99.

Further, the control device 80 controls the roll charging bias to be applied to the charging rolls 130 and 140 of the conveyance roll unit 100 by the power supply device 99.

Here, in the control device 80, while the recording paper P is being conveyed by the conveyance roll unit 100, the peripheral surfaces 110A and 120A of the conveyance rolls 110 and 120 of the conveyance roll unit 100 are charged to −300 to −600 v by the charging rolls 130 and 140.

Further, the control device 80 performs control to adhere toner to the conveyance rolls 110 and 120 of the conveyance roll unit 100 for each preset number of prints, for example, every 4000 prints.

Specifically, any of the image forming sections 32 of the image forming unit 30 forms a patch image with toner, and transfers the patch image to the conveyor belt 21. The power supply device 99 switches the facing rolls 111 and 121 from the grounded state to a state in which a potential larger than the absolute value of the potentials of the conveyance rolls 110 and 120 is applied, and attaches the patch image to the conveyance rolls 110 and 120. The patch image attached to the conveyance rolls 110 and 120 are cleaned by the cleaning blades 150 and 160.

Image Forming Process

Next, the outline of the image forming process in the image forming apparatus 10 will be described.

First, the control device 80 controls each image forming section 32 such that a toner image is formed on the intermediate transfer belt 40 of the image forming unit 30. Similarly, each image forming section 52 is controlled such that a toner image is formed on the intermediate transfer belt 60 of the image forming unit 50.

Specifically, the control device 80 applies a voltage to the photoconductor charging members 34, 54, and charges the peripheral surfaces of the photoconductors 33 and 53 so as to have a predetermined potential, by using the photoconductor charging members 34 and 54 to which the voltage is applied. Subsequently, the control device 80 irradiates the peripheral surfaces of the photoconductors 33 and 53 charged by the photoconductor charging members 34 and 54 with exposure light by the exposure devices 35 and 55 to form an electrostatic latent image, based on the image data acquired via the communication unit 90. Thus, an electrostatic latent image corresponding to the image data is formed on the peripheral surfaces of the photoconductors 33 and 53.

Next, the control device 80 develops the electrostatic latent image formed by the exposure devices 35 and 55 by the developing devices 36 and 56 and visualizes it as a toner image. Further, the control device 80 superimposes and transfers the toner image formed on the peripheral surfaces of the photoconductors 33 and 53 of each color on the intermediate transfer belts 40 and 60, by the primary transfer rolls 37 and 57.

In this way, in the image forming unit 30, for example, a toner image TZ (see FIG. 4) on which yellow (Y), magenta (M), cyan (C), and white (W) toners are superimposed is formed on the intermediate transfer belt 40. Similarly, in the image forming unit 50, for example, a toner image in which black (K), gold (G), silver (S), and transparent (T) toners are superimposed is formed on the intermediate transfer belt 60.

Here, the recording paper P sent out from the accommodating unit 12 to the conveyance path 19 by the feed roll 13 is sent out to the secondary transfer position TJ2 on the upstream side in the conveyance direction, after the convey timing is adjusted by the resist roll pair 15 based on the control of the control device 80. At the secondary transfer position TJ2, the recording paper P is conveyed between the backup roll 42 and the secondary transfer roll 24, so that the toner image on the outer peripheral surface of the intermediate transfer belt 40 is transferred to the recording paper P. Then, the recording paper P on which the toner image is transferred is conveyed to the conveyance direction downstream side and reaches the secondary transfer position TK2 on the conveyance direction downstream side.

At this time, the control device 80 adjusts the timing to start image formation such that the toner image formed on the intermediate transfer belt 60 of the image forming unit 50 is superimposed and transferred on the recording paper P that have been conveyed from the conveyance direction upstream side.

The recording paper P, on which the toner images of each color formed by the image forming unit 30 and the image forming unit 50 are superimposed and transferred, is fixed by the fixing roll pair 16 of the fixing device 18, and then is discharged to the discharge unit 9 provided on the upper part of the image forming apparatus main body 10A, by the discharge roll 17.

Here, in a case where the recording paper P is conveyed between the secondary transfer unit 74 on the conveyance direction upstream side and the secondary transfer unit 76 on the conveyance direction downstream side, the peripheral surfaces 110A and 120A of the conveyance rolls 110 and 120, which are charged to −300 to −600 v, of the conveyance roll unit 100 come into contact with the surface PA to which the toner image TZ (see FIG. 4) of the recording paper P is transferred, and conveys the recording paper P to the conveyance direction downstream side.

Action

Next, the action of the present exemplary embodiment will be described.

In a case where the recording paper P is conveyed between the secondary transfer unit 74 on the conveyance direction upstream side and the secondary transfer unit 76 on the conveyance direction downstream side, the peripheral surfaces 110A and 120A of the conveyance rolls 110 and 120 of the conveyance roll unit 100 come into contact with the surface PA to which the toner image TZ of the recording paper P is transferred, and conveys the recording paper P to the conveyance direction downstream side.

Therefore, compared with the case where there is no member in contact with the surface PA of the recording paper P conveyed between the two secondary transfer units 74 and 76 arranged in the conveyance direction, separation of the recording paper P conveyed between the two secondary transfer units 74 and 76 arranged in the conveyance direction from the conveyance path 19 is prevented. Therefore, the misalignment of the superposition of the toner images in the secondary transfer unit 76 due to the separation of the recording paper P conveyed between the two secondary transfer units 74 and 76 arranged in the conveyance direction from the conveyance path 19 is prevented.

Further, since the peripheral surfaces 110A and 120A of the conveyance rolls 110 and 120 are charged with the same polarity as the toner image TZ by the charging rolls 130 and 140, that is, with a negative polarity, adhesion of toner to the transport rolls 110 and 120 of the negatively charged toner image TZ is prevented, as compared with the case where the peripheral surfaces 110A and 120A of the conveyance rolls 110 and 120 are charged with the opposite polarity to the toner image TZ.

Further, the peripheral surfaces 110A and 120A of the conveyance rolls 110 and 120 are charged to −300 v to −600 v by the charging rolls 130 and 140, and the facing rolls 111 and 121 are 0 v. Therefore, in the charged toner image TZ, the electric field formed between the peripheral surfaces 110A and 120A of the conveyance rolls 110 and 120 and the facing rolls 111 and 121 generates an electrostatic force in the direction toward the conveyor belt 21 and the recording paper P. Therefore, as compared with the case where the electrostatic force acting on the toner image TZ is set to the potential for forming an electric field toward the conveyance rolls 110 and 120, the adhesion of the toner to the conveyance rolls 110 and 120 is reduced.

Further, since the facing rolls 111 and 121 are grounded via the resistors 117 and 127 and the potential is set to 0 v, the cost is lower than the case where the voltage is applied to the facing rolls 111 and 121.

Further, since the peripheral surfaces 110A and 120A of the conveyance rolls 110 and 120 are made of resin and have a small friction coefficient, adhesion of toner to the conveyance rolls 110 and 120 is reduced, as compared with the case of the peripheral surfaces 110A and 120A made of rubber having a large friction coefficient.

Further, since the peripheral surfaces 110A and 120A of the conveyance rolls 110 and 120 are cleaned by the cleaning blades 150 and 160, adhesion to the recording paper P of the toner adhering to the conveyance rolls 110 and 120 is reduced, as compared with the case where the peripheral surfaces 110A and 120A are not cleaned.

Further, the cost is lower than that in the case of electrically cleaning the peripheral surfaces 110A and 120A with a brush.

Further, since the toner is adhered to the peripheral surfaces 110A and 120A of the conveyance rolls 110 and 120 at the set timing, the flapping of the cleaning blades 150 and 160 is reduced, as compared with the case where the toner is not adhered at all.

Further, the distance L1 between the conveyance roll 110 and the secondary transfer unit 74 on the upstream side in the conveyance direction is equal to or less than a minimum width LS, in which an image can be formed, in the conveyance direction. Therefore, in a case where the recording paper PS having the minimum width LS is conveyed, the recording paper PS rests on both the conveyance roll 110 and the secondary transfer unit 74.

Similarly, since the distance L3 between the conveyance roll 120 on the downstream side in the conveyance direction and the secondary transfer unit 76 is equal to or less than the minimum width LS, in a case where the recording paper PS having the minimum width LS is conveyed, the recording paper PS rests on both the conveyance roll 120 and the secondary transfer unit 76.

Therefore, the separation of the recording paper PS from the conveyance path 19 is prevented as compared with the case where the distance between the secondary transfer units 74 and 76 and the conveyance rolls 110 and 120 is larger than the minimum width LS.

Further, since the distance L2 between the conveyance roll 110 and the conveyance roll 120 is equal to or less than the minimum width LS, in a case where the recording paper PS having the minimum width LS is conveyed, the recording paper PS rests on both the conveyance roll 110 and the conveyance roll 120. Therefore, as compared with the case where the distance L2 between the conveyance roll 110 and the conveyance roll 120 is larger than the minimum width LS, the separation of the recording paper PS from the conveyance path 19 is prevented.

Further, since each image forming section 52 is disposed between the intermediate transfer belt 40 and the intermediate transfer belt 60, there is a limit to narrowing the distance between the two secondary transfer units 74 and 76 arranged in the conveyance direction, and the distance between the two secondary transfer units 74 and 76 is widened, so that the recording paper P is likely to be separated from the conveyance path 19. However, the separation of the recording paper P from the conveyance path 19 is prevented by the conveyance rolls 110 and 120.

Second Exemplary Embodiment

Next, an image forming apparatus according to a second exemplary embodiment of the present invention will be described. It should be noted that the first exemplary embodiment has the same configuration as the first exemplary embodiment except that the conveyance roll units are different. Therefore, the description other than the conveyance roll unit will be omitted or simplified.

Conveyance Roll Unit

Figure 6:
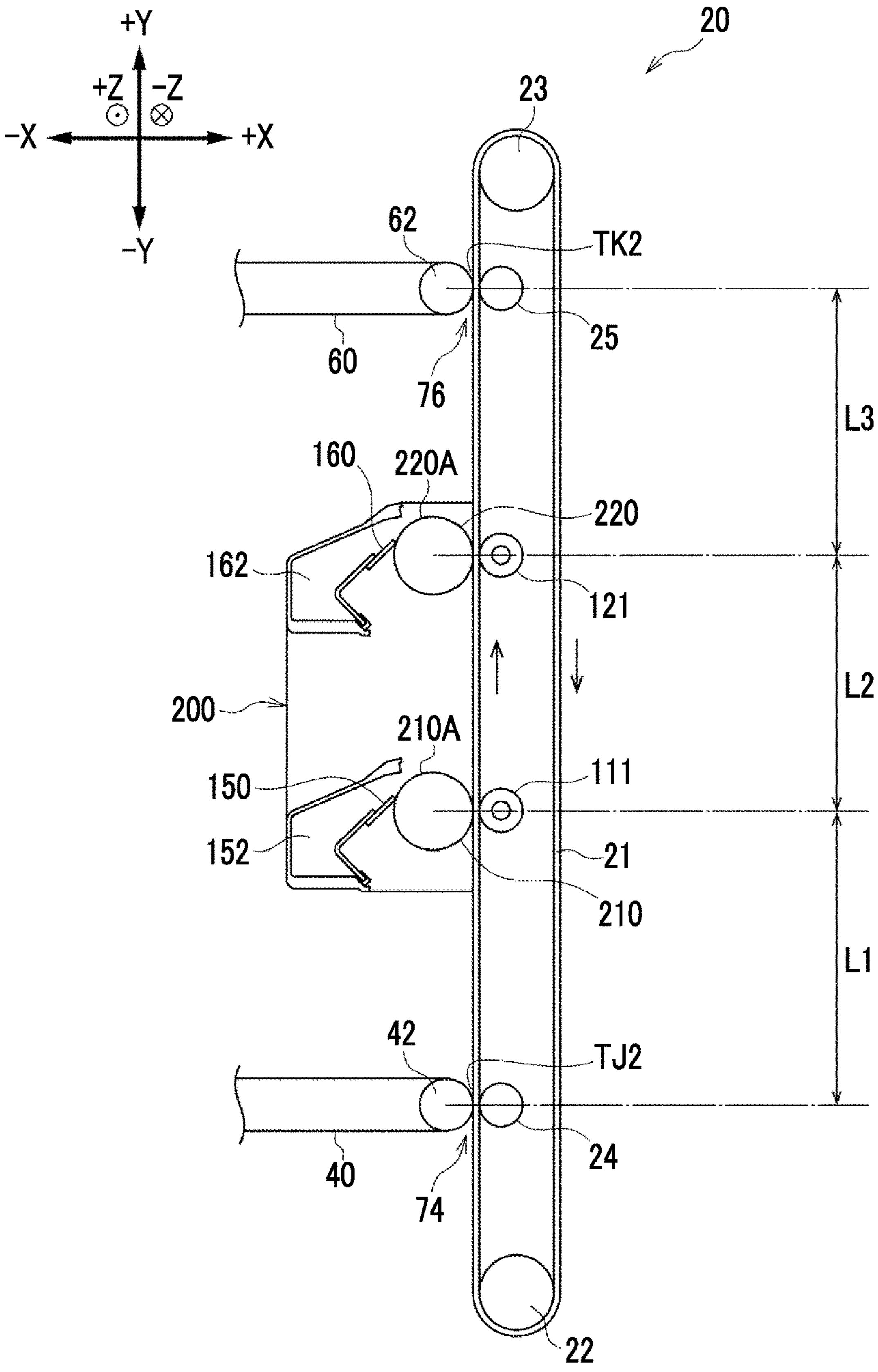
FIG. 6 is a configuration diagram of a conveyor belt device according to a second exemplary embodiment.

As shown in FIG. 6, a conveyance roll unit 200 is provided between the image forming unit 30 and the image forming unit 50 arranged at intervals in the conveyance direction on the surface PA (see FIG. 7) side of the recording paper P of the conveyor belt 21 as an example of the conveyance unit, in the vertical direction in the present exemplary embodiment.

The conveyance roll unit 200 has a plurality of (two in the present exemplary embodiment) conveyance rolls 210 and 220. The recording paper P (see FIG. 7) and the conveyor belt 21 are sandwiched between the conveyance rolls 210 and 220 as an example of the rotating body and the facing rolls 111 and 121, and the recording paper P is conveyed to the downstream side in the conveyance direction. The conveyance rolls 210 and 220 are configured to rotate by a drive mechanism (not shown).

The conveyance rolls 210 and 220 and the members around the conveyance rolls 210 and 220 are the same members except that the positions in the conveyance direction are different. Therefore, in the schematic diagram of FIG. 7, the conveyance rolls 210 and 220 are shown without distinction.

Figure 7:
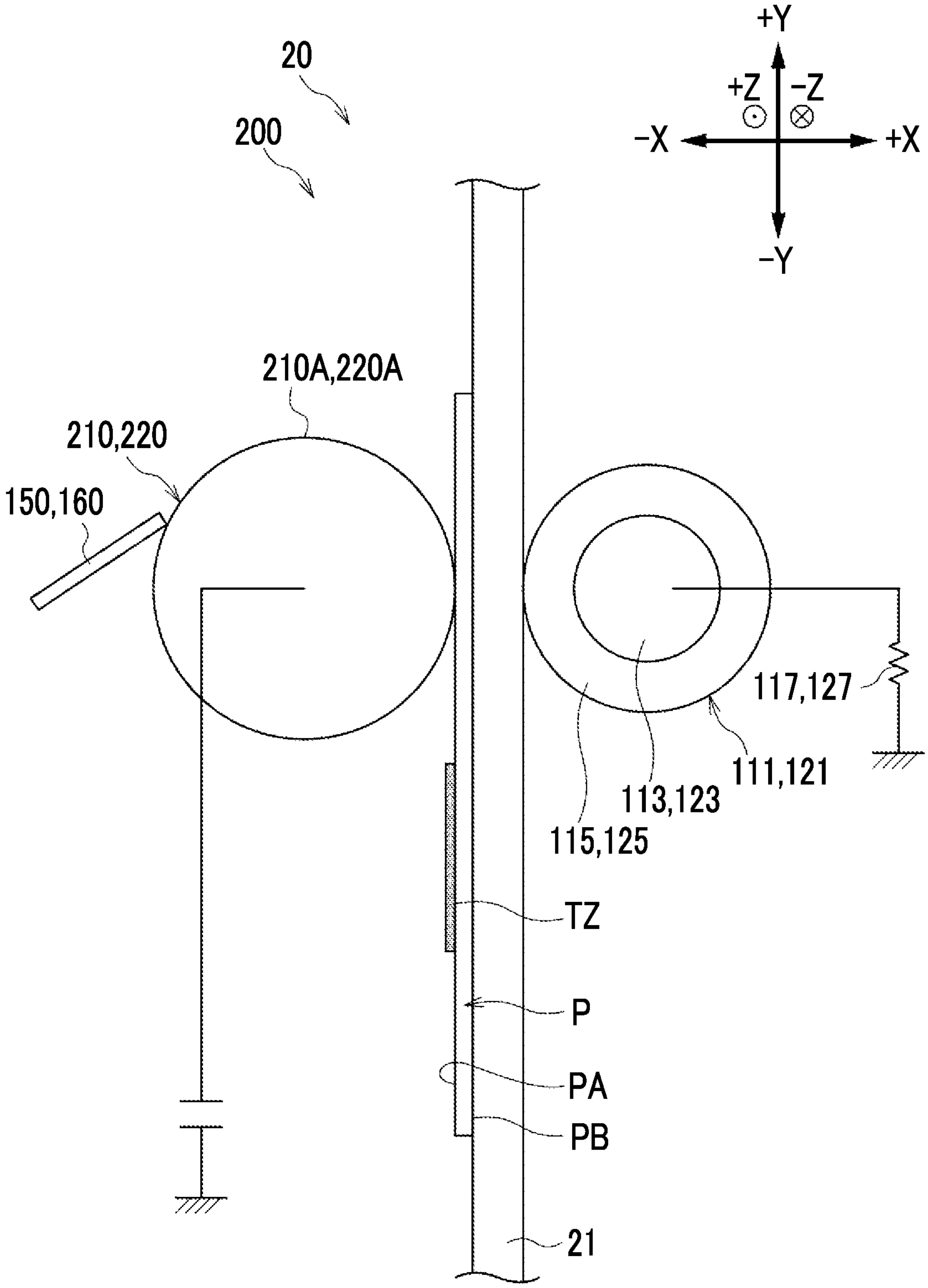
FIG. 7 is a schematic diagram of a main part of FIG. 6.

As shown in FIGS. 6 and 7, the conveyance rolls 210 and 220 are solid metal rolls made of metal and having a circular cross-sectional outer shape orthogonal to the axial direction. In the present exemplary embodiment, the conveyance rolls 210 and 220 are made of SUS304.

The coefficient of static friction with respect to the recording paper P (see FIG. 7) on the peripheral surfaces 210A and 220A of the conveyance rolls 210 and 220 is about 2.0. The recording paper P in this case is plain paper.

Similar to the first embodiment, the distance L1 between the conveyance roll 210 and the secondary transfer unit 74 on the upstream side in the conveyance direction of this second embodiment is equal to or less than the minimum width LS. Similarly, the distance L3 between the conveyance roll 220 and the secondary transfer unit 76 on the downstream side in the conveyance direction is equal to or less than the minimum width LS. Further, the distance L2 between the conveyance roll 210 on the upstream side in the conveyance direction and the conveyance roll 220 on the downstream side in the conveyance direction is equal to or less than the minimum width LS. As shown in FIG. 6, the distances L1, L2, and L3 are the distances between the axes of the conveyance rolls 210 and 220 and the secondary transfer rolls 24 and 25 of the secondary transfer units 74 and 76.

It is desirable that the distance L1 between the conveyance roll 210 on the upstream side in the conveyance direction and the secondary transfer unit 74 is, for example, smaller than the minimum width LS. Similarly, it is desirable that the distance L3 between the conveyance roll 220 on the downstream side in the conveyance direction and the secondary transfer unit 76 is, for example, smaller than the minimum width LS. Further, it is desirable that the distance L2 between the conveyance roll 210 on the upstream side in the conveyance direction and the conveyance roll 220 on the downstream side in the conveyance direction is, for example, smaller than the minimum width LS.

A roll bias is applied to the metal conveyance rolls 210 and 220 by the power supply device 99 (see FIG. 5), and the conveyance rolls 210 and 220 are set to the potential having the same polarity as the toner image TZ (see FIG. 7), that is, a negative polarity in the present exemplary embodiment. In addition, the potentials of the conveyance rolls 210 and 220 in the present exemplary embodiment are −300 v to −600 v, but it is an example and is not limited to this potential.

In addition, in a case where the conveyance rolls 210 and 220 have −300 to −600 v, in the negatively charged toner image TZ (see FIG. 7), the electric field formed between the conveyance rolls 210 and 220 and the facing rolls 111 and 121 generates an electrostatic force in the direction toward the conveyor belt 21 and the recording paper P.

Here, the facing rolls 111 and 121 can be switched from the grounded state to the state in which a potential larger than the absolute value of the potentials of the conveyance rolls 210 and 220 is applied by the power supply device 99 (see FIG. 5). In this state, an electric field formed between the peripheral surfaces 210A and 220A of the conveyance rolls 210 and 220 and the facing rolls 111 and 121 generates an electrostatic force in the direction toward the conveyance rolls 210 and 220.

While the recording paper P is being conveyed by the conveyance roll unit 100, the control device 80 sets the conveyance rolls 210 and 220 of the conveyance roll unit 100 to −300 to −600 v.

Further, the control device 80 performs control to adhere toner to the conveyance rolls 210 and 220 of the conveyance roll unit 200 for each preset number of prints, for example, every 4000 prints.

Specifically, any of the image forming sections 32 of the image forming unit 30 forms a patch image with toner, and transfers the patch image to the conveyor belt 21. The power supply device 99 switches the facing rolls 111 and 121 from the grounded state to a state in which a potential larger than the absolute value of the potentials of the conveyance rolls 210 and 220 is applied, and attaches the patch image to the conveyance rolls 210 and 220. The patch image attached to the conveyance rolls 210 and 220 are cleaned by the cleaning blades 150 and 160.

Action

Next, the action of the present exemplary embodiment will be described.

In a case where the recording paper P is conveyed between the secondary transfer unit 74 on the conveyance direction upstream side and the secondary transfer unit 76 on the conveyance direction downstream side, the peripheral surfaces 210A and 220A of the conveyance rolls 210 and 220 of the conveyance roll unit 200 come into contact with the surface PA to which the toner image TZ of the recording paper P is transferred, and conveys the recording paper P to the conveyance direction downstream side.

Therefore, compared with the case where there is no member in contact with the surface PA of the recording paper P conveyed between the two secondary transfer units 74 and 76 arranged in the conveyance direction, separation of the recording paper P conveyed between the two secondary transfer units 74 and 76 arranged in the conveyance direction from the conveyance path 19 is prevented. Therefore, the misalignment of the superposition of the toner images in the secondary transfer unit 76 due to the separation of the recording paper P conveyed between the two secondary transfer units 74 and 76 arranged in the conveyance direction from the conveyance path 19 is prevented.

Further, the potentials of the conveyance rolls 210 and 220 are −300 v to −600 v, and the potentials of the facing rolls 111 and 121 are 0 v. Therefore, in the negatively charged toner image TZ, the electric field formed between the peripheral surfaces 210A and 220A of the conveyance rolls 210 and 220 and the facing rolls 111 and 121 generates an electrostatic force in the direction toward the conveyor belt 21 and the recording paper P. Therefore, as compared with the case where the electrostatic force acting on the toner image TZ is set to the potential for forming an electric field toward the conveyance rolls 210 and 220, the adhesion of the toner to the conveyance rolls 210 and 220 is reduced.

Further, since the facing rolls 111 and 121 are grounded via the resistors 117 and 127 and the potential is set to 0 v, the cost is lower than the case where the voltage is applied to the facing rolls 111 and 121.

Further, since the peripheral surfaces 210A and 220A of the conveyance rolls 210 and 220 are made of metal and have a small friction coefficient, adhesion of the toner to the conveyance rolls 210 and 220 is reduced, as compared with the case of the peripheral surfaces 210A and 220A made of rubber having a large friction coefficient.

Further, since the peripheral surfaces 210A and 220A of the conveyance rolls 210 and 220 are cleaned by the cleaning blades 150 and 160, adhesion to the recording paper P of the toner adhering to the conveyance rolls 210 and 220 is reduced, as compared with the case where the peripheral surfaces 210A and 220A are not cleaned.

Further, the cost is lower than that in the case of electrically cleaning the peripheral surfaces 210A and 220A with a brush.

Further, since the toner is adhered to the peripheral surfaces 210A and 220A of the conveyance rolls 210 and 220 at the set timing, the flapping of the cleaning blades 150 and 160 is reduced, as compared with the case where the toner is not adhered.

Further, the distance L1 between the conveyance roll 210 and the secondary transfer unit 74 on the upstream side in the conveyance direction is equal to or less than the minimum width LS, in which an image can be formed, in the conveyance direction. Therefore, in a case where the recording paper PS having the minimum width LS is conveyed, the recording paper PS rests on both the conveyance roll 210 and the secondary transfer unit 74.

Similarly, since the distance L3 between the conveyance roll 220 on the downstream side in the conveyance direction and the secondary transfer unit 76 is equal to or less than the minimum width LS, in a case where the recording paper PS having the minimum width LS is conveyed, the recording paper PS rests on both the conveyance roll 220 and the secondary transfer unit 76.

Therefore, the separation of the recording paper PS from the conveyance path 19 is prevented as compared with the case where the distance between the secondary transfer units 74 and 76 and the conveyance rolls 210 and 220 is larger than the minimum width LS.

Further, since the distance L2 between the conveyance roll 210 and the conveyance roll 220 is equal to or less than the minimum width LS, in a case where the recording paper PS having the minimum width LS is conveyed, the recording paper PS rests on both the conveyance roll 210 and the conveyance roll 220. Therefore, as compared with the case where the distance L2 between the conveyance roll 210 and the conveyance roll 220 is larger than the minimum width LS, the separation of the recording paper PS from the conveyance path 19 is prevented.

Further, since each image forming section 52 is disposed between the intermediate transfer belt 40 and the intermediate transfer belt 60, there is a limit to narrowing the distance between the two secondary transfer units 74 and 76 arranged in the conveyance direction, and the distance between the two secondary transfer units 74 and 76 is widened, so that the recording paper P is likely to be separated from the conveyance path 19. However, the separation of the recording paper P from the conveyance path 19 is prevented by the conveyance rolls 210 and 220.

Modification Example

Next, a modification example of the present exemplary embodiment will be described.

Figure 8:
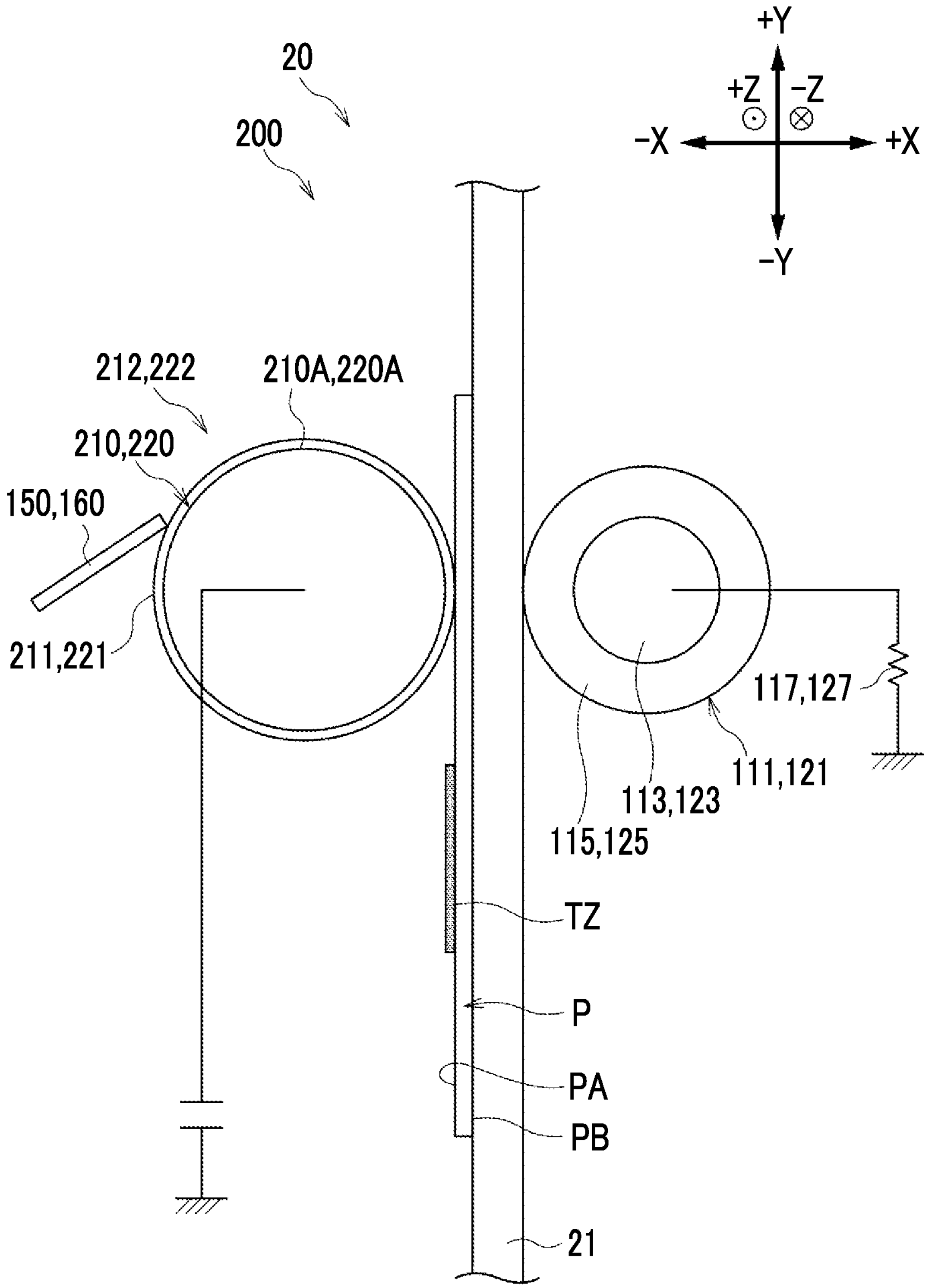
FIG. 8 is a schematic diagram of a main part of a modification example of the second exemplary embodiment.

The conveyance rolls 212 and 222 of the modification example shown in FIG. 8 are made of metal, and are formed with insulating resin coat layers 211 and 221 on the peripheral surfaces 210A and 220A of the solid metal rolls 210 and 220 having a circular cross-sectional outer shape orthogonal to the axial direction.

Here, in the present exemplary embodiment, the metal rolls 210 and 220 are the same as the above-described conveyance rolls 210 and 220, and are made of SUS304. Therefore, the same reference numerals 210 and 220 are attached.

Further, in the present exemplary embodiment, the resin coat layers 211 and 221 as an example of the insulating layer are made of fluororesin as a material.

As described above, since the conveyance rolls 212 and 222 of the modification example shown in FIG. 8 are the same as the conveyance rolls in the second exemplary embodiment except that the resin coat layers 211 and 221 are formed on the conveyance rolls 210 and 220 described above, other description thereof will be omitted.

Since the conductive conveyance rolls 212 and 222 are formed with the insulating resin coat layers 211 and 221, the electrical leak resistance is improved as compared with the case where the resin coat layer is not formed.

Others

The present invention is not limited to the above exemplary embodiments.

For example, in the above exemplary embodiments, the charging potentials of the conveyance rolls 110 and 120 are the same, but the present invention is not limited thereto. The charging potentials of the conveyance roll 110 and the conveyance roll 120 may be different.

Similarly, in the above exemplary embodiments, the potentials of the conveyance rolls 210 and 220 are the same, but the potentials are not limited to this. The potentials of the conveyance roll 210 and the conveyance roll 220 may be different.

Further, for example, in the above exemplary embodiments, the facing rolls 111 and 121 are grounded, but the present invention is not limited thereto. A voltage may be applied to the facing rolls 111 and 121. In a case of applying a voltage to the facing rolls 111 and 121, the conveyance rolls 210 and 210 may be grounded.

The conveyance rolls 110, 120, 210, and 220 may be grounded or may be electrically floating.

Further, for example, in the above exemplary embodiments, the conveyance roll unit 100 has two conveyance rolls 110 and 120 and the conveyance roll unit 200 has two conveyance rolls 210 and 220, but the present invention is not limited thereto. The conveyance roll unit may have only one conveyance roll, or may have three or more conveyance rolls.

Further, for example, in the above exemplary embodiments, the roll main bodies 114 and 124 of the conveyance rolls 110 and 120 and the resin coat layers 211 and 221 of the conveyance rolls 212 and 222 are made of fluororesin, but the present invention is not limited to thereto.

Further, for example, in the above exemplary embodiments, the conveyance rolls 210 and 220 are made of SUS304, but the present invention is not limited thereto. Metal other than SUS304, for example, SUM24L may be used. Further, a conductive material other than metal may be, for example, urethane foam. The conductivity means that the volume resistance is equal to or less than $10^6$ to $10^{12}\Omega$).

Further, the coefficient of static friction with respect to the recording paper P on the peripheral surfaces 110A, 120A, 210A, and 220A of the conveyance rolls 110, 120, 210, and 210 is equal to or less than about 0.3, but the present invention is not limited thereto. However, it is desirable that the coefficient of friction of the peripheral surface of the conveyance roll is, for example, small.

Further, for example, in the above exemplary embodiments, the conveyance rolls 110, 120, 210, and 220 are driven to rotate at the same speed as the conveyor belt 21, but the present invention is not limited thereto. The conveyance rolls 110, 120, 210, and 220 may be configured to be driven to rotate with the rotation of the conveyor belt 21.

Further, for example, in the above exemplary embodiments, the charging members that charge the conveyance rolls 110 and 120 are the charging rolls 130 and 140, but the present invention is not limited thereto. A charging member other than the charging rolls 130 and 140, for example, a charging brush or a scorotron may be used.

Further, for example, in the above exemplary embodiments, the cleaning members that clean the conveyance rolls 110, 120, 210, and 220 are the cleaning blades 150 and 160, but the present invention is not limited thereto. The cleaning members other than the cleaning blades 150 and 160, for example, a cleaning brush may be used.

Further, for example, in the above exemplary embodiments, the image forming units 30 and 50 have four image forming sections 32 and 52, respectively, but the present invention is not limited thereto. The image forming unit may have two or more image forming sections.

Further, for example, in the above exemplary embodiments, the image forming apparatus 10 includes two image forming units, that is, the image forming unit 30 and the image forming unit 50, but the present invention is not limited thereto. It may be an image forming apparatus including three or more image forming units.

In a case where three or more image forming units are provided, there are three or more secondary transfer units that sequentially perform secondary transfer from the intermediate transfer belt of each image forming unit to the recording paper P. It is desirable to provide, a conveyance roll unit between all the secondary transfer units, but the present invention is not limited to thereto.

Further, for example, in the above exemplary embodiments, the recording medium is the recording paper P such as plain paper, but the present invention is not limited to thereto. The recording medium may be a sheet-like member to which a toner image such as OHP can be transferred and fixed.

The conveyance direction of the recording paper P to be conveyed by the conveyor belt unit 20 in the present exemplary embodiments is the Y direction, but the present invention is not limited thereto. The conveyance direction may be the X direction, the Z direction, or the diagonal direction.

Further, for example, in the above exemplary embodiments, the conveyance unit that conveys a recording medium in contact with one surface of the recording medium is the conveyor belt 21, but the conveyance unit is not limited thereto. The conveyance unit may be, for example, a drum other than the belt.

Further, for example, in the above exemplary embodiments, the intermediate transfer bodies to which the toner image is primarily transferred are the intermediate transfer belts 40 and 60, but the present invention is not limited thereto. The intermediate transfer body may be, for example, a drum other than the belt.

Further, for example, in the above exemplary embodiments, the rotating bodies whose peripheral surfaces come into contact with the other surface of the recording medium are the conveyance rolls 110, 120, 210, and 220, but the present invention is not limited thereto. The rotating body may be, for example, a drum or a belt other than the roll.

Further, for example, in the above exemplary embodiments, adhesion of the toner is the conveyance rolls 110, 120, 210, and 220 of the conveyance roll units 100, 200 for each preset number of prints, for example, every 4000 prints, by switching the facing rolls 111 and 121 from the grounded state to a state in which a potential larger than the absolute value of the potentials of the conveyance rolls 110, 120, 210, and 220 is applied, but the present invention is not limited thereto. Toner may be attached to the conveyance rolls 110, 120, 210, and 220 by any method. For example, toner may be attached by changing the potentials of the conveyance rolls 110, 120, 210 and 220 while the facing rolls 111 and 121 are in the grounded state.

Further, the configuration of the image forming apparatus is not limited to the configuration of the above exemplary embodiments, and various configurations can be used. The plurality of exemplary embodiments and modification example may be performed in combination with each other. Further, the present invention can be implemented in various ways without departing from the concept of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a conveyor belt that conveys a recording medium in contact with one surface of the recording medium along a conveyance path;

a plurality of intermediate transfer belts that are arranged in a conveyance direction of the conveyance path, in contact with another surface of the recording medium onto which toner images formed by a plurality of image forming sections are primarily transferred, wherein the another surface of the recording medium is opposite to the one surface in contact with the conveyor belt;

a plurality of secondary transfer units that are arranged in a conveyance direction and secondarily transfer the toner images of the plurality of intermediate transfer belts to the other surface of the recording medium conveyed by the conveyor belt, wherein each of the plurality of secondary transfer units comprises one of the plurality of intermediate transfer belts and a backup roll and a secondary transfer roll that sandwich the one of the plurality of intermediate transfer belts; and at least one conveyance roll in contact with the other surface of the recording medium conveyed by the conveyor belt between one secondary transfer unit and another secondary transfer unit, among the plurality of secondary transfer units arranged in the conveyance direction, wherein the at least one conveyance roll is paired with a facing roll disposed to face the at least one conveyance roll with the conveyor belt interposed therebetween, the facing roll comprises a metal shaft portion and a rubber main body formed around the metal shaft portion, and the metal shaft portion is grounded, wherein a peripheral surface of the at least one conveyance roll is insulating, and a charging roll that charges the peripheral surface of the at least one conveyance roll with the same polarity as the toner image is provided.

2. The image forming apparatus according to claim 1, the conveyor belt is stretched in the conveyance direction, the peripheral surface of the at least one conveyance roll is adjusted to a surface potential set by the charging roll, and the facing roll is set to a potential at which an electrostatic force acting on the toner image forms an electric field toward a recording medium side, with respect to the surface potential of the at least one conveyance roll.

3. The image forming apparatus according to claim 2, wherein the peripheral surface of the at least one conveyance roll is made of resin.

4. The image forming apparatus according to claim 1, wherein the peripheral surface of the at least one conveyance roll is made of resin.

5. The image forming apparatus according to claim 1, further comprising:

a cleaning member for cleaning the peripheral surface of the at least one conveyance roll;

wherein the cleaning member is a blade that comes into contact with the peripheral surface of the at least one conveyance roll.

6. The image forming apparatus according to claim 1, wherein the at least one conveyance roll comprises a plurality of conveyance rolls, and a distance between one of the plurality of secondary transfer units and one of the plurality of conveyance rolls is set to be equal to or less than a minimum width that allows image formation in the conveyance direction of the recording medium.

7. The image forming apparatus according to claim 6, wherein a distance between one conveyance roll and another conveyance roll, among the plurality conveyance rolls arranged in the conveyance direction, is set to be equal to or less than the minimum width that allows image formation in the conveyance direction of the recording medium.

8. The image forming apparatus according to claim 1, wherein one or more of the image forming sections are disposed between the intermediate transfer belts arranged in the conveyance direction.

* * * * *